(12) United States Patent
Kimura

(10) Patent No.: US 8,319,893 B2
(45) Date of Patent: Nov. 27, 2012

(54) VIDEO DISPLAY CONTROL DEVICE FOR DETERMINING COMPATIBILITY BETWEEN THE DEVICE AND AN EXTERNALLY CONNECTED INSTRUMENT

(75) Inventor: Takahiro Kimura, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 12/439,056

(22) PCT Filed: Jul. 3, 2008

(86) PCT No.: PCT/JP2008/062431
§ 371 (c)(1),
(2), (4) Date: Feb. 26, 2009

(87) PCT Pub. No.: WO2009/016934
PCT Pub. Date: Feb. 5, 2009

(65) Prior Publication Data
US 2010/0118194 A1    May 13, 2010

(30) Foreign Application Priority Data

Jul. 31, 2007  (JP) ................................. 2007-199920
May 21, 2008  (JP) ................................. 2008-133330

(51) Int. Cl.
*H04N 5/44*  (2011.01)
(52) U.S. Cl. ...................................................... 348/552
(58) Field of Classification Search .................. 348/706, 348/705, 552–554, 725
See application file for complete search history.

(56) References Cited

U.S. PATENT DOCUMENTS

| | | | |
|---|---|---|---|
| 6,300,976 B1 * | 10/2001 | Fukuoka | 348/231.99 |
| 6,344,875 B1 * | 2/2002 | Hashimoto et al. | 348/207.1 |
| 6,789,196 B1 * | 9/2004 | Miyano | 713/189 |
| 7,032,024 B1 * | 4/2006 | Park | 709/227 |
| 7,685,132 B2 * | 3/2010 | Hyman | 707/999.01 |
| 7,917,862 B2 * | 3/2011 | Breidenbach et al. | 715/771 |
| 8,095,709 B2 * | 1/2012 | Kaga | 710/62 |
| 2002/0003576 A1 * | 1/2002 | Konishi et al. | 348/232 |

(Continued)

FOREIGN PATENT DOCUMENTS

JP   2004-007639   1/2004

(Continued)

OTHER PUBLICATIONS

International. Search Report dated Jul. 3, 2008 for PCT/JP2008/062431.

(Continued)

*Primary Examiner* — Paulos Natnael
(74) *Attorney, Agent, or Firm* — Pillsbury Winthrop Shaw Pittman, LLP

(57) ABSTRACT

According to one embodiment, a video display device has a connection unit configured to connect to a plurality of external instruments via a network, a receiving unit configured to receive, from the plurality of external instrument connected to the video display device via the connection unit, standard compatibility information indicating that the external instrument meets the mutual controllability standards, a display unit configured to display video information output by one of the plurality of external instruments and a selection unit configured to select one of the plurality of external instruments, corresponded to information based on the standard compatibility information, connected to the connection unit as an output source of video information to be displayed on the display unit.

8 Claims, 8 Drawing Sheets

U.S. PATENT DOCUMENTS

| | | | |
|---|---|---|---|
| 2004/0022428 A1* | 2/2004 | Chi et al. | 382/145 |
| 2005/0190295 A1* | 9/2005 | Mizutome et al. | 348/553 |
| 2006/0001777 A1* | 1/2006 | Araki | 348/706 |
| 2007/0026827 A1* | 2/2007 | Miyano et al. | 455/132 |
| 2007/0074255 A1* | 3/2007 | Morioka | 725/78 |
| 2007/0136769 A1* | 6/2007 | Goldberg et al. | 725/81 |
| 2007/0294430 A1* | 12/2007 | Narayanan et al. | 709/245 |
| 2008/0126965 A1* | 5/2008 | Shimotashiro et al. | 715/764 |
| 2008/0313356 A1* | 12/2008 | Blinn et al. | 710/7 |
| 2009/0033793 A1* | 2/2009 | Kimura | 348/555 |
| 2009/0059072 A1* | 3/2009 | Tomita | 348/554 |
| 2009/0249424 A1* | 10/2009 | Gordon et al. | 725/118 |

FOREIGN PATENT DOCUMENTS

| | | |
|---|---|---|
| JP | 2004-357029 | 12/2004 |
| JP | 2005-167387 | 6/2005 |
| JP | 2006-108750 | 4/2006 |
| JP | 2007-36854 | 2/2007 |
| JP | 2007-150853 | 6/2007 |
| JP | 2007-189346 | 7/2007 |
| JP | 2008-048136 | 2/2008 |
| WO | WO 03/028402 | 4/2003 |
| WO | WO 2006/098095 | 9/2006 |
| WO | WO 2007/037379 | 4/2007 |
| WO | WO 2007/072821 A1 | 6/2007 |

OTHER PUBLICATIONS

Japanese Office Action dated Jan. 6, 2009.

* cited by examiner

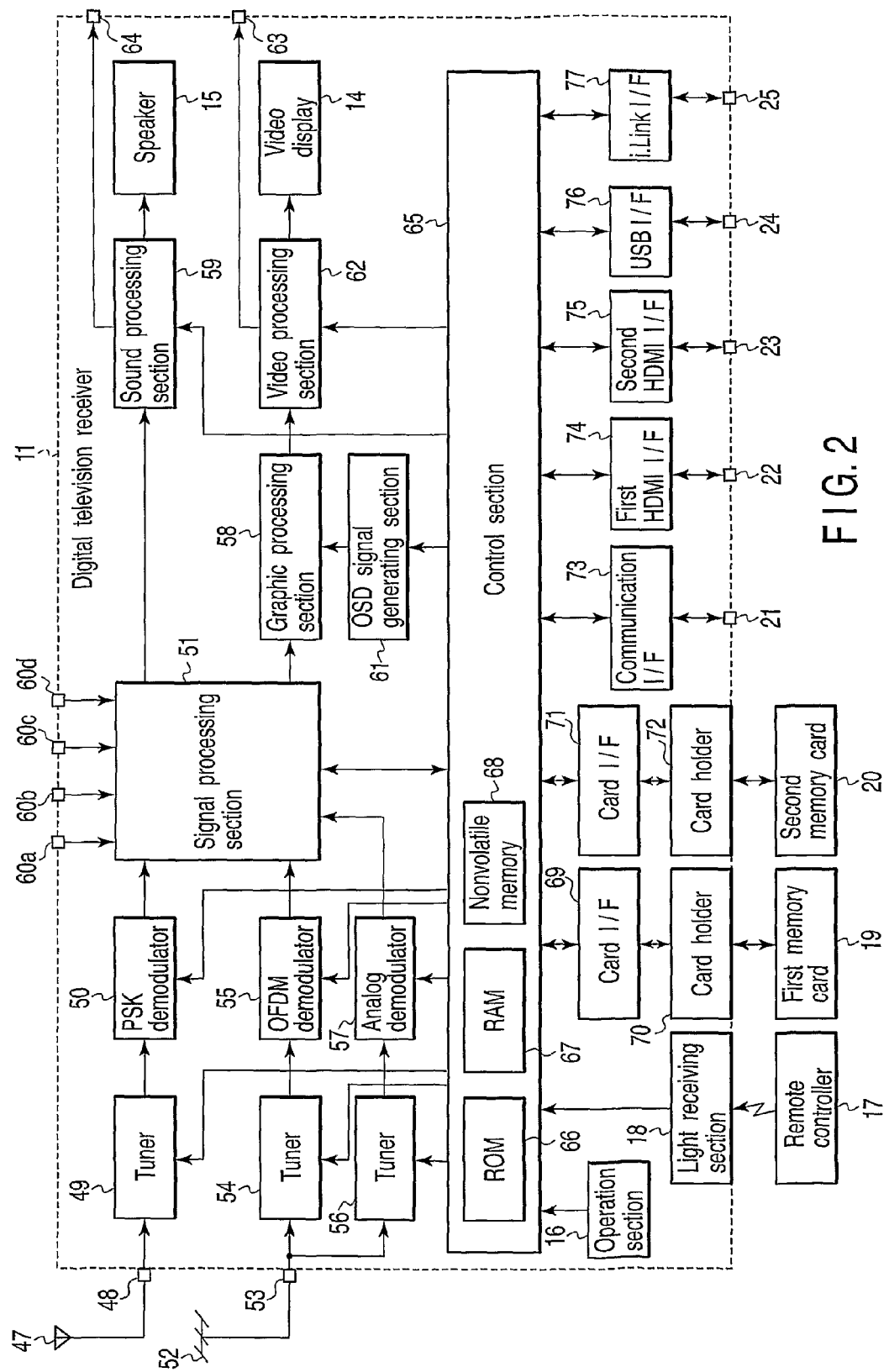
F I G. 2

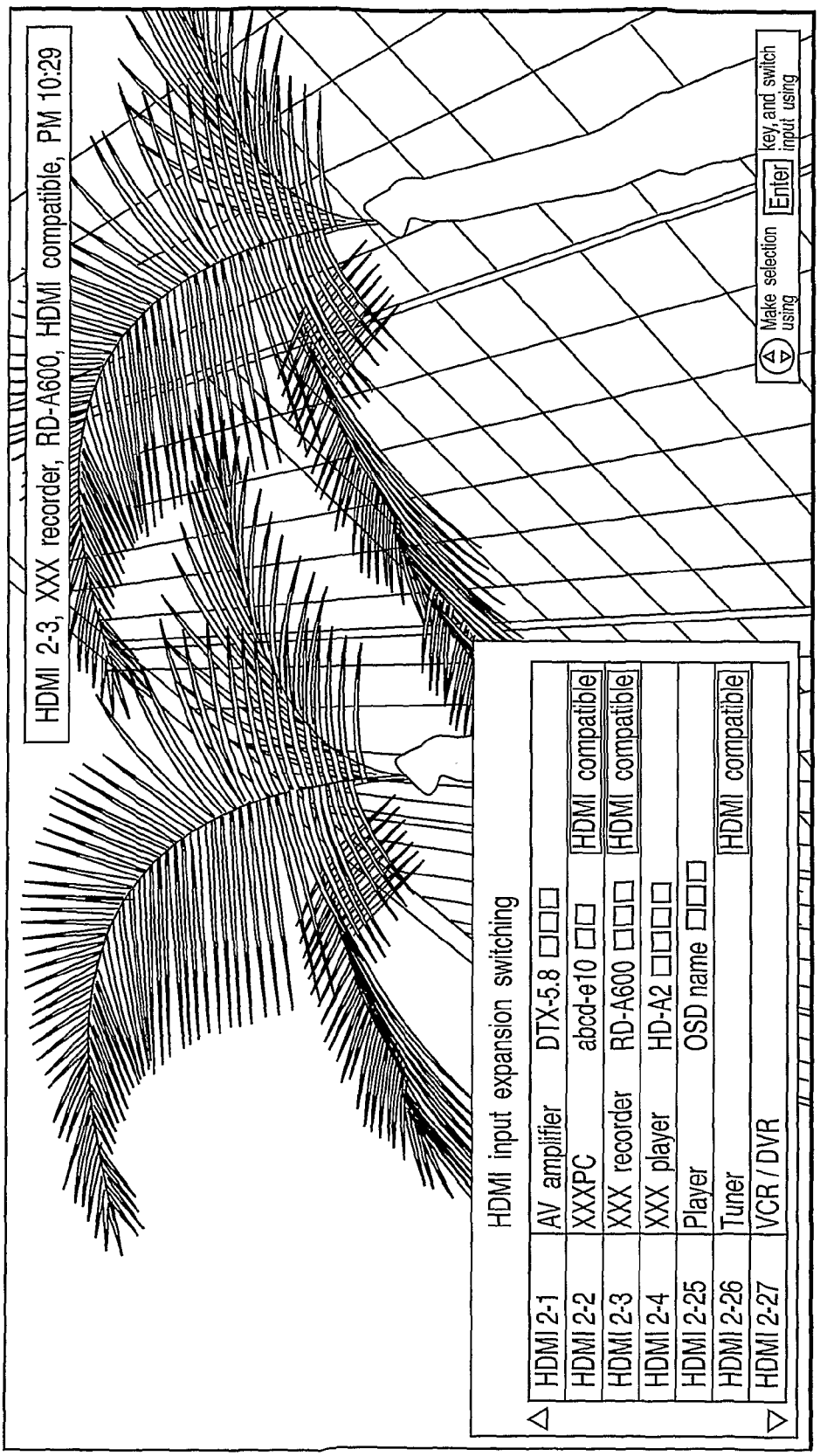
F I G. 5

US 8,319,893 B2

VIDEO DISPLAY CONTROL DEVICE FOR DETERMINING COMPATIBILITY BETWEEN THE DEVICE AND AN EXTERNALLY CONNECTED INSTRUMENT

This is the U.S. National Stage of PCT/JP2008/062431, filed Jul. 3, 2008, which in turn claims priority to Japanese Patent Application Nos. 2007-199920, filed Jul. 31, 2007 and 2008-133330, filed May 21, 2008, the entire contents of both applications are incorporated herein by reference in their entireties.

TECHNICAL FIELD

One embodiment of the invention relates to a video display device that determines whether or not an instrument connected to the video display device can be operated in conjunction with the video display device.

BACKGROUND ART

As is well known, digitalization of television broadcasting has recently been promoted. For example, in Japan, in addition to satellite digital broadcasting such as BS (Broadcasting Satellite) digital broadcasting and 110-degree CS (Communication Satellite) digital broadcasting, terrestrial digital broadcasting has been started. A television receiver that receives these broadcastings connects to PC, a mobile instrument, an AV instrument, or the like via a network. A CEC (Consumer Electronics Control)-compatible external instrument connected to the television receiver via an HDME (High Definition Multimedia Interface) terminal can be operated in conjunction with the television receiver by operating the television receiver via a remote controller or the like.

Jpn. Pat. Appln. KOKAI Publication No. 2006-108750 discloses a configuration which, when a video signal based on a digital signal received via an HDMI connector is selected, extracts display related information contained in the received digital signal to automatically set a display mode in accordance with the display related information.

However, Jpn. Pat. Appln. KOKAI Publication No. 2006-108750 discloses an arrangement in which a display device that receives signals conforming to HDMI standards acquires instrument information on external instruments but not an arrangement in which when a certain operation is performed on the external instrument, the display device appropriately notices a user of whether or not the external instrument can be operated in conjunction with the television receiver.

Furthermore, Jpn. Pat. Appln. KOKAI Publication No. 2008-48136 discloses the configuration of a transmission and reception device which, when a plurality of instruments are connected together, displays how one instrument and another instrument connected to that instrument using a CEC line of an HDMI cable control each other.

DISCLOSURE OF INVENTION

In view of these circumstances, an object of the present invention is to provide a video display device that enables determination of whether or not the receiver can operate in conjunction with an external instrument connected to the receiver.

According to one aspect of the present invention, there is provided a video display device comprising: a connection unit configured to connect to a plurality of external instruments via a network; a receiving unit configured to receive, from the plurality of external instrument connected to the video display device via the connection unit, standard compatibility information indicating that the external instrument meets the mutual controllability standards; a display unit configured to display video information output by one of the plurality of external instruments; a selection unit configured to select one of the plurality of external instruments, corresponded to information based on the standard compatibility information, connected to the connection unit as an output source of video information to be displayed on the display unit.

BRIEF DESCRIPTION OF DRAWINGS

FIG. 2 is a block diagram showing the internal configuration of the information communication terminal according to the first embodiment of the invention;

FIG. 5 is a diagram showing a display screen of a video display of the information communication terminal according to the first embodiment of the invention;

BEST MODE FOR CARRYING OUT THE INVENTION

Figure 1:
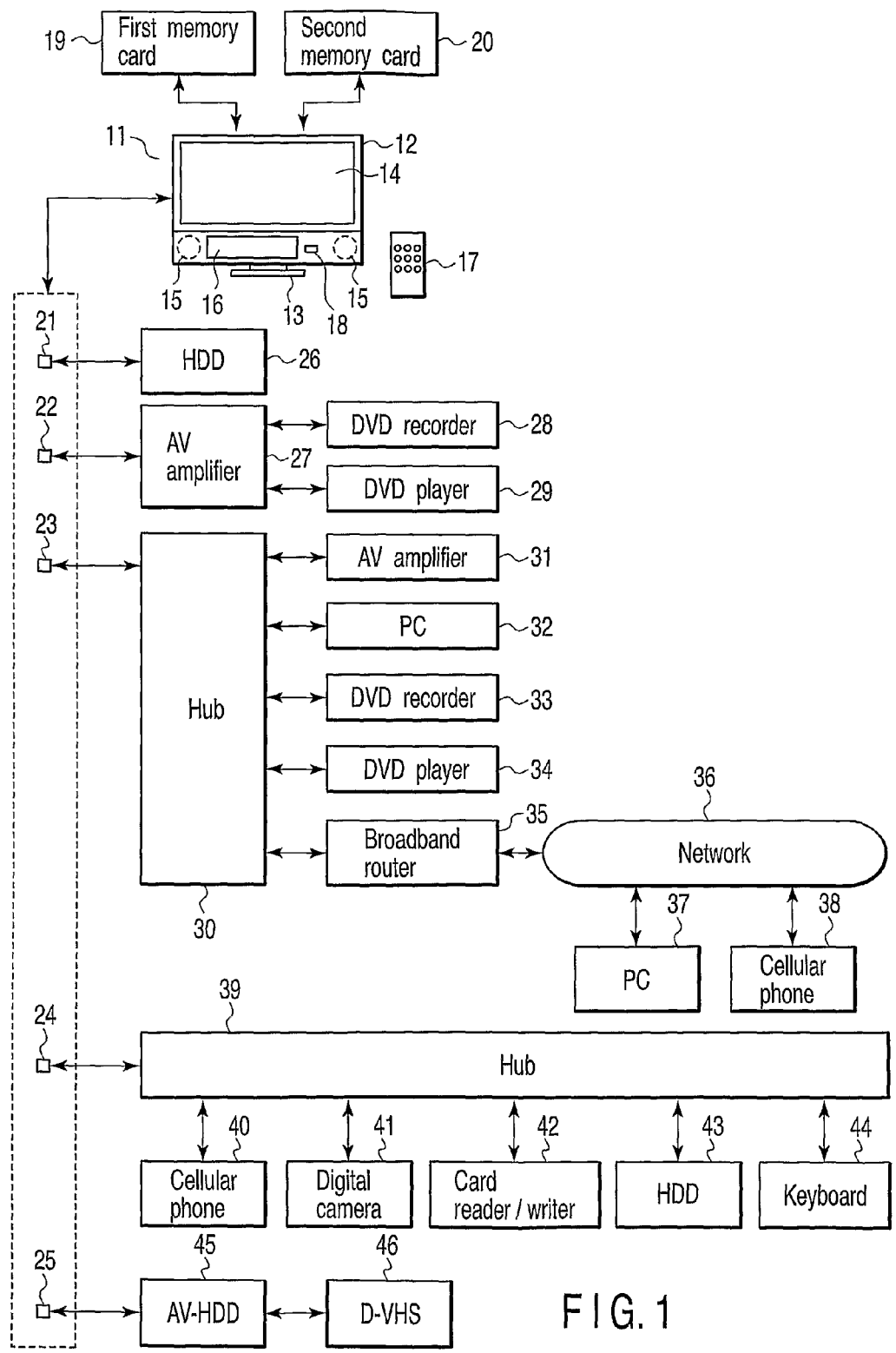
FIG. 1 is a block diagram showing the configuration of an information communication terminal and peripheral instruments according to a first embodiment of the invention.

An embodiment of the invention will be described below in detail with reference to the drawings. FIG. 1 schematically shows the appearance of an information communication terminal 11 described in the embodiment and an example of a network system centered around the information communication terminal 11.

The information communication terminal 11 (for example, a digital television receiver) is mainly composed of a thin cabinet 12 and a support 13 that supports the cabinet upright. A flat panel video display 14, a speaker 15, an operation section 16, a light receiving section 18, and the like are installed in the cabinet 12; the video display 14 is made up of, for example, a liquid crystal display panel, and the light receiving section 18 receives operational information transmitted by a remote controller 17.

A first memory card 19, for example, an SD (Secure Digital) memory card or MMC (MultiMedia Card), can be installed in and removed from the information communication terminal 11. Information such as programs or photographs is recorded in and reproduced from the first memory card 19.

A second memory card [IC (Integrated Circuit) card] 20 can also be installed in and removed from the information communication terminal 11, and contains a semiconductor memory in which, for example, contract information is recorded. Information is recorded in and reproduced from the second memory card 20.

The information communication terminal 11 also comprises a LAN (Local Area Network) terminal 21, a first HDMI terminal 22, a second HDMI terminal 23, a USB (Universal Serial Bus) terminal 24, and an i. LINK terminal 25.

The LAN terminal 21 can be used as a LAN-compatible HDD (Hard Disk Drive). The LAN terminal 21 is used to record and reproduce information, via Ethernet (registered trade mark), in and from LAN-compatible HDD 25, which is a connected NAS (Network Attached Storage). The LAN terminal 21 as a port dedicated for LAN-compatible HDD enables information on programs with high vision image quality to be stably recorded in HDD 26 without being affected by other network environments, network use status, or the like.

A common LAN-compatible port using Ethernet (registered trade mark) can also be used as the LAN terminal 22. In this case, instruments such as LAN-compatible HDD, PC (Personal Computer), HDD incorporated DVD recorder, and the like are connected to the LAN terminal 22, for example, via a hub so that information can be transmitted between the instruments and the LAN terminal 22.

External instruments including a DVD recorder 28 and a DVD player 29 are connected to the first HDMI terminal 22 via an AV amplifier 27.

External instruments such as an AV amplifier 31, PC (Personal Computer) 32, an HDD incorporated DVD recorder 33, and a DVD player 34 are connected to the second HDMI terminal 22, for example, via a hub 30 and used to allow information to be transmitted between the instruments and the second HDMI terminal 23. The first HDMI terminal 22 and the second HDMI terminal 23 transmit and receive information to and from the external instruments in a form conforming to HDMI standards.

Moreover, the second HDMI terminal 23 is connected to a network 36, for example, the Internet, via a broadband router 35 connected to the hub 30 and used to allow information to be transmitted to and received from PC 37, a cellular phone 38, and the like via the network 36.

The USB terminal 24 is used as a common USB compatible port and connects to, for example, a cellular phone 40, a digital camera 41, a card reader/writer 42 for a memory card, HDD 43, a keyboard 44, and the like via a hub 39 and used to allow information to be transmitted to and received from these USB instruments.

The i. LINK terminal 25 connects to, for example, AV-HDD 45 and D (Digital)-VHS (Video Home System) 46 and connects serially to a terrestrial digital tuner (not shown), and used to allow information to be transmitted to and received from these instruments.

FIG. 2 shows main signal processing systems in the digital television broadcasting receiver 11. A satellite digital television broadcasting signal received by a BS/CS digital broadcasting receiving antenna 47 is supplied to a satellite digital broadcasting tuner 49 via an input terminal 48 to select a broadcasting signal for a desired channel.

The broadcasting signal selected by the tuner 49 is then supplied to a PSK (Phase Shift Keying) demodulator 50, demodulated into a digital video signal and a digital audio signal, and output to a signal processing section 51.

A terrestrial digital television broadcasting signal received by a terrestrial digital broadcasting receiving antenna 52 is supplied to a terrestrial digital broadcasting tuner 54 via an input terminal 53 to select a broadcasting signal for a desired channel.

The broadcasting signal selected by the tuner 54 is then supplied to an OFDM (Orthogonal Frequency Division Multiplexing) demodulator 55, demodulated into a digital video signal and a digital audio signal, and output to the signal processing section 51.

A terrestrial analog television broadcasting signal received by the terrestrial digital broadcasting receiving antenna 52 is supplied to a terrestrial analog broadcasting tuner 56 via the input terminal 53 to select a broadcasting signal for a desired channel. The broadcasting signal selected by the tuner 56 is then supplied to an analog demodulator 57, demodulated into an analog video signal and an analog audio signal, and output to the signal processing section 51.

The signal processing section 51 selectively executes predetermined digital signal processing on the digital video signal and audio signal supplied by each of the PSK demodulator 50 and OFDM demodulator 55 and output the resulting signals to a graphic processing section 58 and a sound processing section 59, respectively.

A plurality of (in the figures, four) input terminals 60a, 60b, 60c, and 60d are connected to the signal processing section 51. The input terminals 60a to 60d allow external instruments to input analog video and audio signals to the digital television broadcasting receiver 11.

The signal processing section 51 selectively digitalizes the analog video and audio signals supplied by the analog demodulator 57 and the input terminals 60a to 60d, executes predetermined digital signal processing on the digitalized video and audio signals, and outputs the resulting video and audio signals to the graphic processing section 58 and the sound processing section 59.

The graphic processing section 58 has a function of superimposing an OSD signal generated by an OSD (On Screen Display) signal generating section 61 on the digital video signal supplied by the signal processing section 51. The graphic processing section 54 can selectively output the output video signal from the signal processing section 51 and the output OSD signal from the OSD signal generating section 61 and can combine these output signals together so that each of the output signals constitutes half of a screen.

The digital video signal output by the graphic processing section 58 is supplied to a video processing section 62. The video processing section 62 converts the input digital video signal into an analog video signal in a format enabling the signal to be displayed on the video display 14. The video processing section 62 then outputs the analog video signal to the video display 14 for display and also directs the signal to an external instrument via the output terminal 63.

The sound processing section 59 converts the input digital audio signal into an analog audio signal in a format enabling the signal to be reproduced by the speaker 15. The sound processing section 59 then outputs the analog audio signal to the speaker 15 for sound reproduction and also directs the signal to an external instrument via the output terminal 64.

A control section 65 integrally controls all the operations of the digital television broadcasting receiver 11 including the various receiving operations described above. The control section 65 contains CPU (Central Processing Unit) and the like and receives operational information from the operation section 16 or operational information transmitted by the remote controller 17 and received via the light receiving section 18 to control the appropriate sections so as to reflect the contents of the operations.

In this case, the control section 65 mainly utilizes ROM (Read Only Memory) 66 in which control programs executed by CPU are stored, RAM (Random Access Memory) 67 that provides a work area for CPU, and a nonvolatile memory 68 in which various pieces of setting information, control information, and the like are stored.

The control section 65 is connected, via a card I/F (interface) 69, to a card holder 70 in the first memory card 19 can be installed. The control section 65 can thus transmit information via the first memory card 19, installed in the card holder 70 and the card I/F 69.

The control section 65 is further connected, via a card I/F 71, to a card holder 72 in which the second memory card 20 can be installed. The control section 65 can thus transmit information via the second memory card 20, installed in the card holder 72 and the card I/F 71.

The control section 65 is connected to the LAN terminal 21 via a communication I/F 73. The control section 65 can thus transmit and receive information to and from LAN-compatible HDD 26, connected to the LAN terminal 21, via the communication I/F 73. In this case, the control section 65 has a DHCP (Dynamic Host Configuration Protocol) server function to assign an IP (Internet Protocol) address to LAN-compatible HDD 26, connected to the LAN terminal 21, for control.

The control section 65 is further connected to the first HDMI terminal 22 via a first HDMI I/F 74. The control section 65 can thus transmit and receive information to and from the instruments (see FIG. 1) connected to the first HDMI terminal 22, via the first HDMI I/F 74. The control section 65 is further connected to the second HDMI terminal 23 via a first HDMI I/F 75. The control section 65 can thus transmit and receive information to and from the instruments (see FIG. 1) connected to the second HDMI terminal 23, via the first HDMI I/F 75.

The control section 65 is connected to the USB terminal 24 via a USB I/F 76. The control section 65 can thus transmit and receive information to and from the instruments (see FIG. 1) connected to the USB terminal 24, via the USB I/F 76.

The control section 65 is further connected to the i. LINK terminal 25 via an i. LINK I/F 77. The control section 65 can thus transmit and receive information to and from the instruments (see FIG. 1) connected to the i. LINK terminal 25, via the i. LINK I/F 77.

Figure 3:
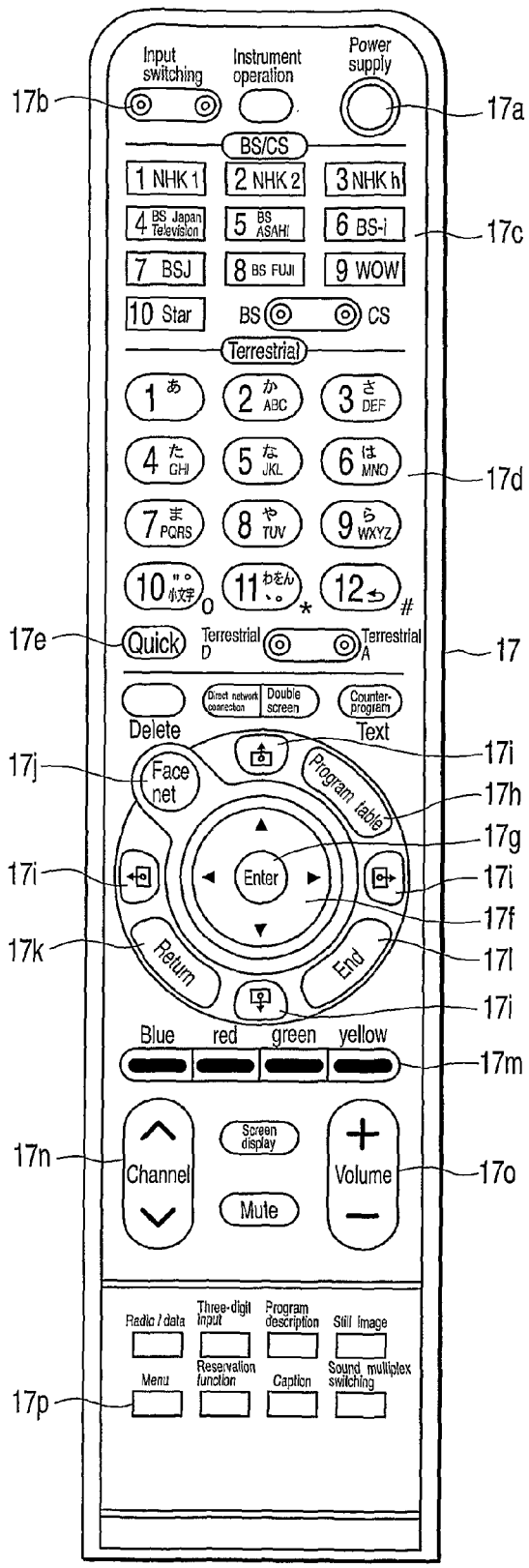
FIG. 3 is a diagram showing the appearance of a remote controller for the information communication terminal according to the first embodiment of the invention.

FIG. 3 shows the appearance of the remote controller 17. The remote controller 17 mainly has a power supply key 17a, an input switch key 17b, a direct select key 17c for satellite digital broadcasting channels, a direct select key 17d for terrestrial digital broadcasting channels, a quick key 17e, a cursor key 17f, an enter key 17g, a program table key 17h, a page switching key 17i, a face net (navigation) key 17j, a return key 17k, an end key 17l, a blue, red, green, and yellow color key 17m, a channel up down key 17n, a volume adjustment key 17o, and a menu key 17p.

Figure 4:
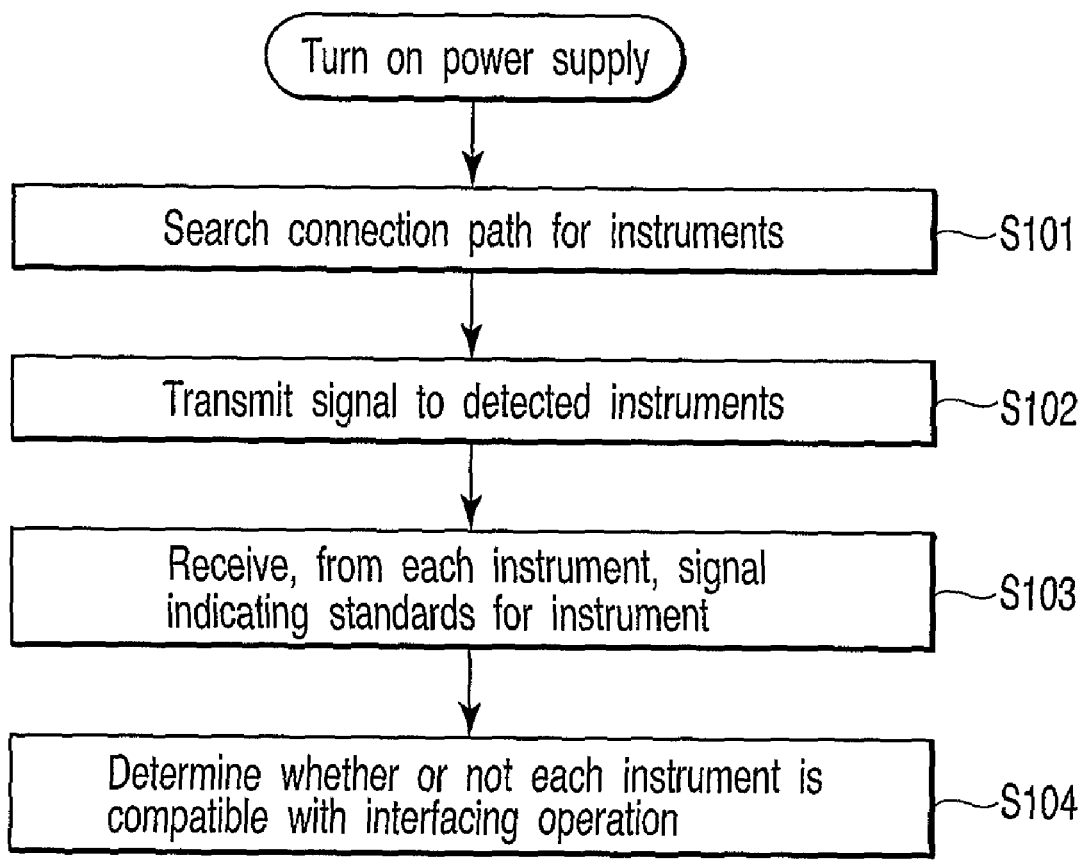
FIG. 4 is a flowchart illustrating how the information communication terminal according to the first embodiment of the invention identifies external instruments.

Now, with reference to a flowchart shown in FIG. 4, description will be given of the determination of whether or not an external instrument connected to the information communication terminal 11 can be operated in conjunction with the television receiver using the remote controller 17 for the information communication terminal 11. In the following description, the external instrument is connected to the first HDMI terminal 22 and the second HDMI terminal 23.

As shown in FIG. 1, the plurality of external instruments are connected to each of the first HDMI terminal 22 and second HDMI terminal 23 of the information communicational terminal 11. Upon sensing operation of the power supply key 17a performed through the operation section 16 or the remote controller 17, the control section 65 activates the appropriate sections of the information communication terminal 11.

The control section 65 identifies the external instruments connected to the first HDMI terminal 22 and the second HDMI terminal 23 (step S101).

The control section 65 transmits a command to the external instruments connected to the first HDMI terminal 22 and the second HDMI terminal 23 to identify the external instruments connected to the information communication terminal 11 on the basis of the presence or absence of a response signal to the command signal.

At this time, each of the external instruments transmits a signal containing a logical address to the information communication terminal 11 at a predetermined timing. The logical address is defined as one of the numbers 0 to 15. Of the numbers 0 to 15, one number is set for the television receiver, three numbers are set for the recorders, three numbers are set for the players, one number is set for the AV amplifier, six numbers are set for the tuners, and the remaining numbers are set for the other instruments so that the different numbers correspond to the respective instrument types. The external instrument acquires one of the numbers which corresponds to that instrument and transmits the number to the information communication terminal 11.

When the information communication terminal 11 receives the signal transmitted by the external instrument and containing the logical address, the control section 65 determines the type of the external instrument transmitting the signal, on the basis of information on the correspondences between the logical addresses and the instrument types which information is recorded in the nonvolatile memory 68. Besides the logical addresses defined as 0 to 15, vender commands originally set by the corresponding venders may be used. In this case, the external instrument transmits the vender command corresponding to that instrument to the information communication terminal 11. When the information communication terminal 11 receives the vender command, the control section 65 determines the type of the external instrument transmitting the signal, on the basis of information on the correspondences between the vender commands and the instrument types which information is recorded in the nonvolatile memory 68. The instrument type is defined as an XXX (vender name) recorder or an XXX (vender name) player in accordance with the corresponding vender command.

To determine the connection relationship between the external equipment and the first HDMI terminal 22 or second HDMI terminal 23, the control section 65 defines instrument numbers for the external instruments.

If the control section 65 transmits a command to determine the presence or absence of external instruments connected to the first HDMI terminal 22 and the second HDMI terminal 23 and receives a response signal to the command via the first HDMI I/F 74, the control section 65 defines the external instrument connected to the first HDMI terminal 22 as number 1. If the control section 65 receives a response signal via the second HDMI I/F 75, the control section 65 defines the instrument number of external instrument connected to the second HDMI terminal 23 as 2.

The control section 65 records the instrument types and the like transmitted by the connected external instruments, in the nonvolatile memory 68 in association with the instrument numbers.

For example, if the plurality of instruments are connected in series with the first HDMI terminal 22 as shown in FIG. 1 and the control section 65 receives a plurality of response signals via the first HDMI I/F 74 or if the plurality of instruments are connected in parallel with second HDMI terminal 23 via the hub 30 and control section 65 receives a plurality of response signals via the first HDMI I/F 74, then the control section 65 sets the instrument numbers as follows.

The AV amplifier 27 is connected to the first HDMI terminal 22. The DVD recorder 28 and the DVD player 29, each having an HDMI terminal, are connected to input HDMI terminals provided in the AV amplifier 27.

The control section 65 further sets an instrument number 1-X (X is set to be any number) for all the instruments connected to the first HDMI terminal 22.

For example, the control section 65 sets 1-1 for the AV amplifier 27, 1-2 for the DVD recorder 28, and 1-3 for the DVD player 29. The control section 65 then records information contained in a signal transmitted by the AV amplifier 27, in the nonvolatile memory 68 in association with the instrument number 1-1. Similarly, the control section 65 records information contained in a signal transmitted by the DVD recorder 28, in the nonvolatile memory 68 in association with the instrument number 1-2. The control section 65 records information contained in a signal transmitted by the DVD player 29, in the nonvolatile memory 68 in association with the instrument number 1-3.

The control section 65 sets an instrument number 2-X (X is set to be any number) for all the instruments connected to the second HDMI terminal 23. For example, the control section 65 sets 2-1 for the AV amplifier 31, 2-2 for PC 32, 2-3 for the DVD recorder 33, and 2-4 for the DVD player 34. The control section 65 then records information contained in a signal transmitted by the AV amplifier 31, in the nonvolatile memory 68 in association with the instrument number 2-1. Similarly, the control section 65 then records information contained in a signal transmitted by PC 32, in the nonvolatile memory 68 in association with the instrument number 2-2. The control section 65 records information contained in a signal transmitted by the DVD recorder 33, in the nonvolatile memory 68 in association with the instrument number 2-3. The control section 65 records information contained in a signal transmitted by the DVD player 34, in the nonvolatile memory 68 in association with the instrument number 2-4. Each of the external instruments transmits type name information on that instrument to the information communication terminal 11. The control section 65 records the optionally set instrument numbers, the instrument types, and the type names in the nonvolatile memory 68 in association with one another.

The control section 65 then transmits, to each of the external instruments connected to the first and second HDMI terminals 22 and 23, a signal requesting the external instrument to inform the control section 65 of whether or not the instrument is compatible with CEC (step S102).

If the external instrument is compatible with CEC, the user can operate the information communication terminal 11 via the remote controller 17 utilizing an HDMI-CEC command, to operate the CEC-compatible external instrument in conjunction with the information communication terminal 11.

Then, on the basis of the signals returned by the external instruments connected to the first HDMI terminal 22 and the second HDMI terminal 23, the control section 65 determines whether or not each of the external instruments is compatible with CEC (step S103). The control section 65 then records HDMI input list information including HDMI information for all the external instruments, in the nonvolatile memory 68; the HDMI information contains the optionally set instrument numbers, the instrument types, the type names, and whether or not the external instrument is compatible with CEC (compatible with HDMI), which are associated with one another (step S104).

Here, the AV amplifier 31 is incompatible with CEC, PC 32 is compatible with CEC, the DVD recorder 33 is compatible with CEC, and the DVD player 34 is incompatible with CEC; the AV amplifier 31, PC 32, the DVD recorder 33, and the DVD player 34 are all connected to the second HDMI terminal 23 via the hub 30.

For example, for the AV amplifier 31, the instrument number is 2-1, the instrument type is an AV amplifier, the type name is DTX-5.8, and the AV amplifier 31 is compatible with CEC. Accordingly, the lack of the HDMI compatibility is recorded in the nonvolatile memory 68. For PC 32, the instrument number is 2-2, the instrument type is an XXX (vender name) PC, the type name is abcd-e10, and PC 32 is compatible with CEC. Accordingly, the presence of the HDMI compatibility is recorded in the nonvolatile memory 68. Similarly, the HDMI input list information is displayed for all the external instruments HDMI-connected to the information communication terminal 11. For the DVD recorder 33, the instrument number is 2-3, the instrument type is an XXX (vender name) recorder, the type name is RD-A600, and PC 32 is compatible with CEC. Accordingly, the presence of the HDMI compatibility is recorded in the nonvolatile memory 68. For the DVD player 34, the instrument number is 2-4, the instrument type is an XXX (vender name) player, the type name is HD-A2, and PC 32 is incompatible with CEC. Accordingly, the lack of the HDMI compatibility is recorded in the nonvolatile memory 68.

Upon sensing a predetermined operation performed by the remote controller 17, the control section 65 can read HDMI input list information such as that shown in FIG. 5, from the nonvolatile memory 68 and display the information on the video display 14.

The HDMI input list information contains the instrument number, the instrument type, the type name, and whether or not the instrument is compatible with HDMI, in this order; specifically, the video display 14 displays (2-1, AV amplifier, DTX-5.8, HDMI compatible), (2-2, XXX (vender name) PC, abcd-e10, HDMI compatible), (2-3, XXX (vender name) recorder, RD-A600, HDMI compatible), and (2-4, XXX (vender name) player, HD-A2). When the instrument is compatible with HDMI, "HDMI compatible" is displayed. When the instrument is incompatible with HDMI, "HDMI compatible" is not displayed.

On a display screen for the HDMI input list information, the user can use the cursor key 17f on the remote controller 17 to select a desired external instrument the input signal from which is to be displayed on the video display 14. Upon sensing that the user uses, on the display screen for the input list information, the enter key 17g on the remote controller 17 to input the HDMI information on the desired external instrument, the control section 65 displays the input signal from the external instrument on the display screen of the video display 14. The control section 65 also acquires the corresponding HDMI information on the external instrument from the nonvolatile memory 68 for display.

When, for example, the user selects a section with the instrument number 2-3 from the HDMI input list information so as to allow video information output by the DVD recorder 33 to be displayed on the video display 14, the control section 65 controllably displays the video information transmitted by the DVD recorder 33 on the video display 14. The control section 65 further displays the HDMI information on the DVD recorder 33 at any position on the video display 14 (for example, the upper right end of the display 14 as shown in FIG. 5).

At this tithe, as shown in FIG. 5, the control section 65 visibly displays 2-3 as an instrument number, XXX (vender name) recorder as an instrument type, RD-A600 as a type name, and "HDMI compatible", as the HDMI information on the DVD recorder 33 acquired from the HDMI input list information recorded in the nonvolatile memory 68.

By viewing the HDMI information on the DVD recorder 33 displayed on the video display 14, the user can easily determine whether or not the DVD recorder 33 operates in conjunction with the information communication terminal 11. That is, in connection with the control of the DVD recorder 33 for reproduction or the like, the user can quickly determine whether or not the DVD recorder 33 can be operated in conjunction with the information communication terminal 11 via the remote controller 17.

Since the HDMI input list information shows the instrument type, the user can easily view what external instruments are connected to the information communication terminal 11. Since whether or not the HDMI compatible operation is possible is displayed in association with the instrument type of the external instrument, the user can easily determine whether the desired external instrument can be operated in conjunction with the information communication terminal 11 via the remote controller 17 or the external instrument must be directly operated.

CEC-incompatible (the "HDMI compatible" section is not displayed on the video display 14) external instruments cannot be operated even by operating the information communication terminal 11 via the remote controller 17. This prevents the user from performing erroneous operations, improving convenience.

The above processing executed by the control section 65 is similarly executed on the instruments each connected to one of the terminals other than the first HDMI terminal 22 and the second HDMI terminal 23, that is, the LAN terminal 21, the USB terminal 24, and the i. LINK terminal 25, and having a function similar to CEC.

Now, a second embodiment will be described. In the first embodiment, the control section 65 determines whether or not the external instruments connected to the HDMI terminal 22 and the second HDMI terminal 23 each are compatible with CEC (compatible with HDMI). In the second embodiment, the control section 65 transmits information (compatibility function version information) indicating how the information communication terminal 11 is compatible with HDMI in connection with each external instrument. The control section 65 receives the compatibility function version information from each external instrument.

The HDMI compatibility is classified into, for example, three levels. That is, the control section 65 determines the HDMI compatibility to be Ver. 1 when the information communication terminal 11 allows the external instrument to be powered on and off using the remote controller 17. The control section 65 determines the HDMI compatibility to be Ver. 2 when the information communication terminal 11 allows the external instrument to be powered on and off and to perform a reproducing operation. The control section 65 determines the HDMI compatibility to be Ver. 3 when the information communication terminal 11 allows the external instrument to be powered on and off and to perform a reproducing operation and a recording operation.

If the external instrument is HDMI-compatible but cannot transmit or receive the compatibility function version information to or from the information communication terminal 11, the control section 65 determines the external instrument to be only HDMI-compatible.

Figure 6:
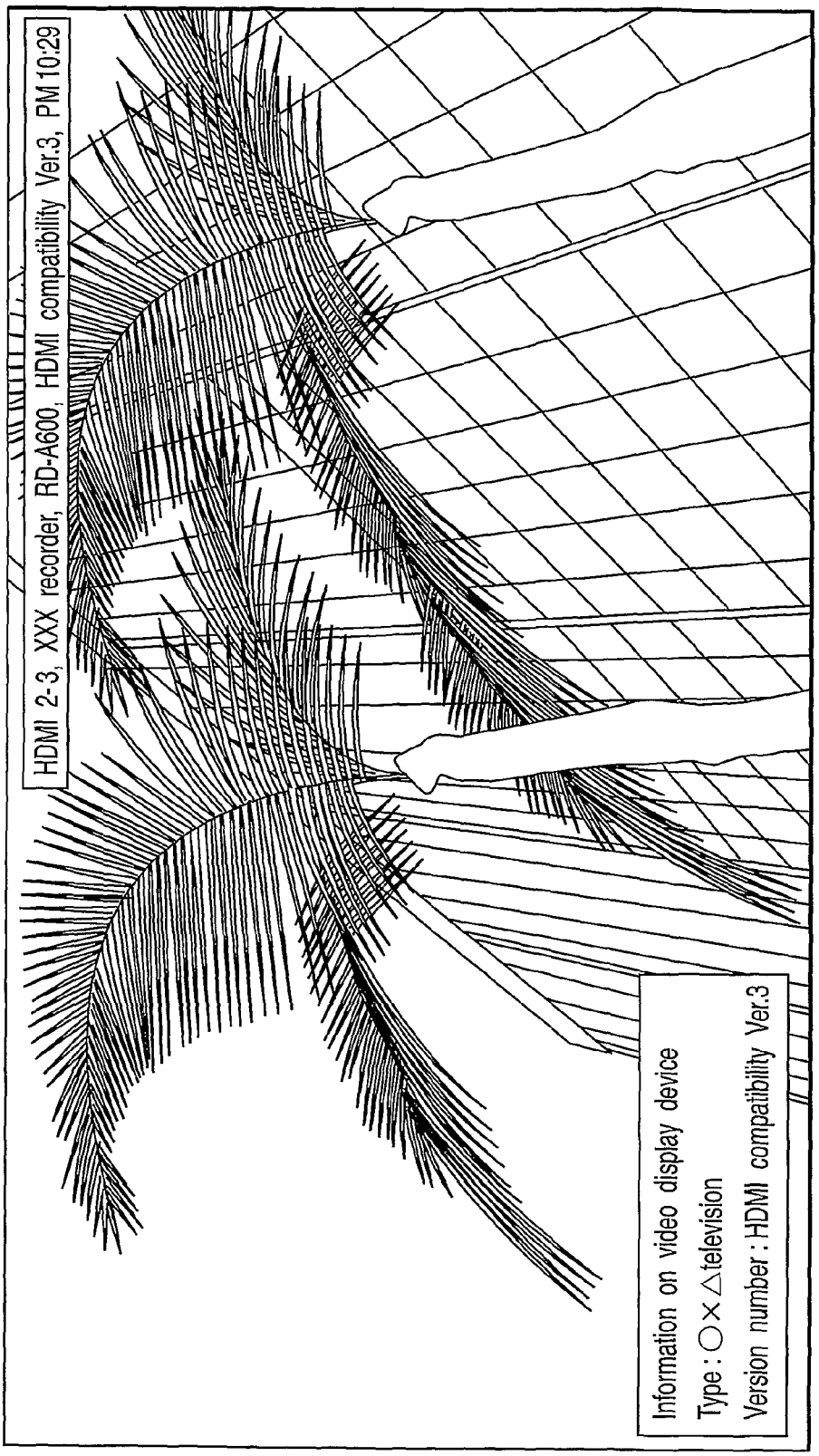
FIG. 6 is a diagram showing a display screen showing compatibility function version information on an information communication terminal in accordance with the second embodiment.

FIG. 6 is a diagram showing that the video display 14 displays the compatibility function version information on the information communication terminal 11.

Upon sensing a predetermined operation performed via the remote controller 17, the control section 65 can read instrument information such as the model name of the information communication terminal 11 and the compatibility function version information from the nonvolatile memory and displays the information in a predetermined area of the display screen of the video display 14.

In the description below, for example, the compatibility function version information on the information communication terminal 11 is Ver. 2. Upon sensing the predetermined operation performed via the remote controller 17, the control section 65 reads an HDMI-compatible instrument list shown in FIG. 7 from the nonvolatile memory 68 and displays the list on the video display 14.

Specifically, the HDMI-compatible instrument list shows (2-1, AV amplifier, DTX-5.8, HDMI compatibility Ver. 1), (2-2, XXX (company name) PC, abcd-e10, HDMI compatibility Ver. 2), (2-3, XXX (company name) recorder, RD-A600, HDMI compatibility Ver. 3→2), (2-4, XXX (company name) player, HD-A2, HDMI-incompatible), (2-25, player, no model name, HDMI-incompatible), (2-26, player, no model name, HDMI compatibility Ver. 2), and (2-27, player, no model name, HDMI); the list shows an instrument number, an instrument type, a model name, HDMI compatibility, and a version in this order.

If the information communication terminal 11 and the external instrument are HDMI-compatible, the video display 14 displays the letters "HDMI-compatible". If the information communication terminal 11 and the external instrument are HDMI-incompatible, the video display 14 does not display the letters "HDMI-compatible". Here, the DVD recorder 33 is HDMI-compatible, and the compatibility function version information is the HDMI compatibility Ver. 3. However, for the information communication terminal 11, the compatibility function version information is the HDMI compatibility Ver. 2. Thus, the compatibility function version information on the DVD recorder 33, which is an external instrument, indicates a higher version than that on the information communication terminal 11. Consequently, between the information communication terminal 11 and the DVD recorder 33, the HDMI compatibility defined in the HDMI compatibility Ver. 2 is enabled, but the HDMI compatibility defined in the HDMI compatibility Ver. 3 but not in the HDMI compatibility Ver. 2 is disabled. Therefore, the video display 14 displays the "HDMI compatibility Ver. 3→2" in order to indicate that the HDMI compatibility defined in the HDMI compatibility Ver. 2 is enabled between the DVD recorder 33 and the information communication terminal 11.

Furthermore, instead of showing the compatibility function version information on the DVD recorder 33 as the HDMI compatibility Ver. 3→2, for example, the video display 14 can display the "HDMI compatibility Ver. 3" in a color lighter than that of the other pieces of compatibility function information. That is, the video display 14 can display the compatibility function version information such that the user can determine, at a first sight, that the HDMI compatibility defined in the HDMI compatibility Ver. 3 is not enabled for the DVD recorder 33.

Figure 7:
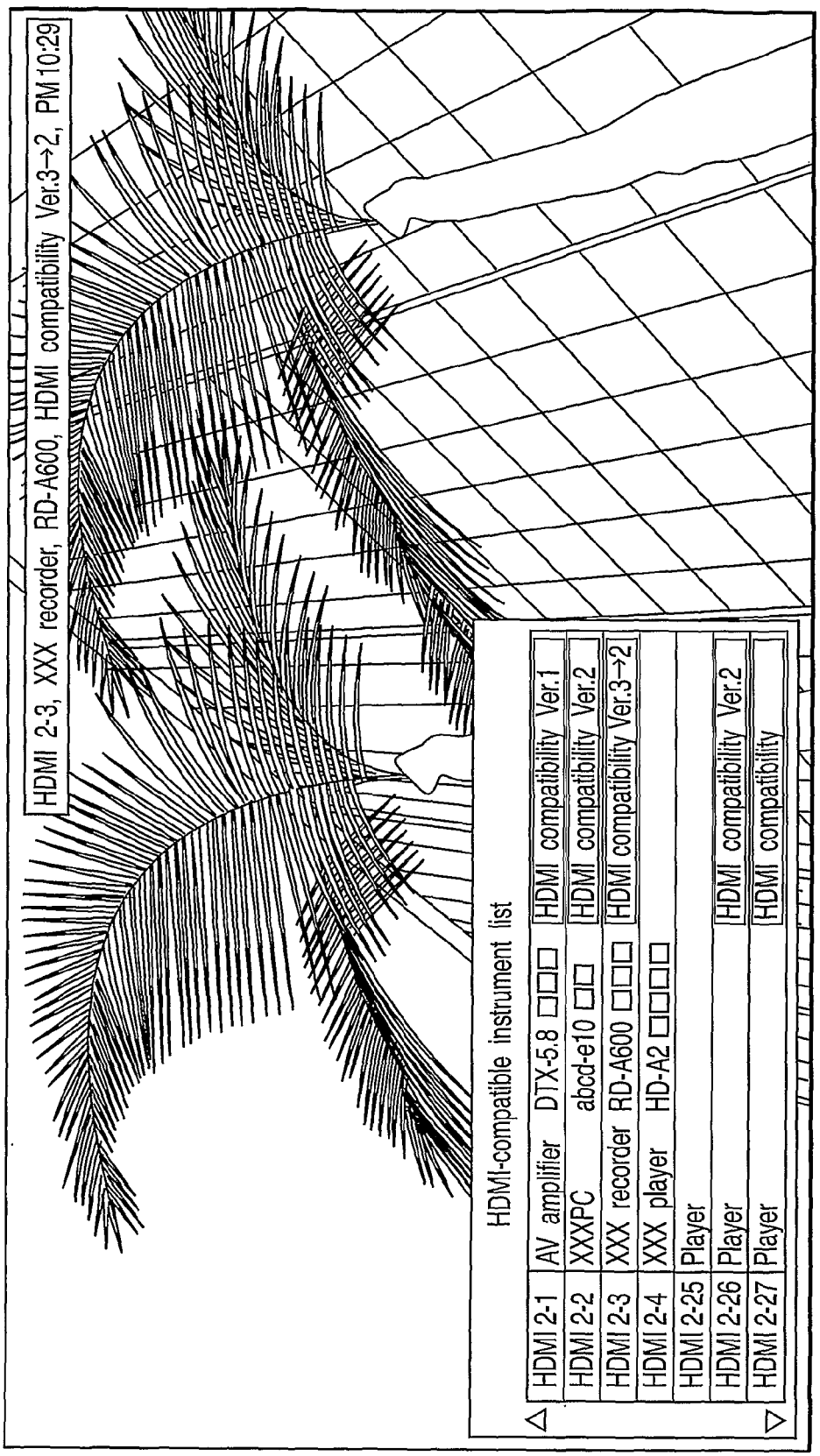
FIG. 7 is a diagram showing a display screen of an HDMI-compatible instrument list in accordance with a second embodiment.

Now, it is assumed that the user selects a column with an instrument number 2-3 from the HDMI-compatible instrument list so that video information output by the DVD recorder 33 is displayed on the video display 14. The video display 14 displays the video information output by the DVD recorder 33 in a predetermined display area of the video display 14 and HDMI information on the DVD recorder 33 in another area. The control section 65 may perform control such that the video information is displayed on the video display 14, while the HDMI information on the DVD recorder 33 is synthetically displayed at any position. As shown in FIG. 7, the video display 14 displays the HDMI information on the DVD recorder 33, contained in the HDMI input list information recorded in the nonvolatile memory 68; specifically, the video display 14 displays "2-3" as an instrument number, "XXX (company name) recorder" as an instrument type, "RD-A600" as a model name, and "HDMI compatibility Ver. 3→2".

Figure 8:
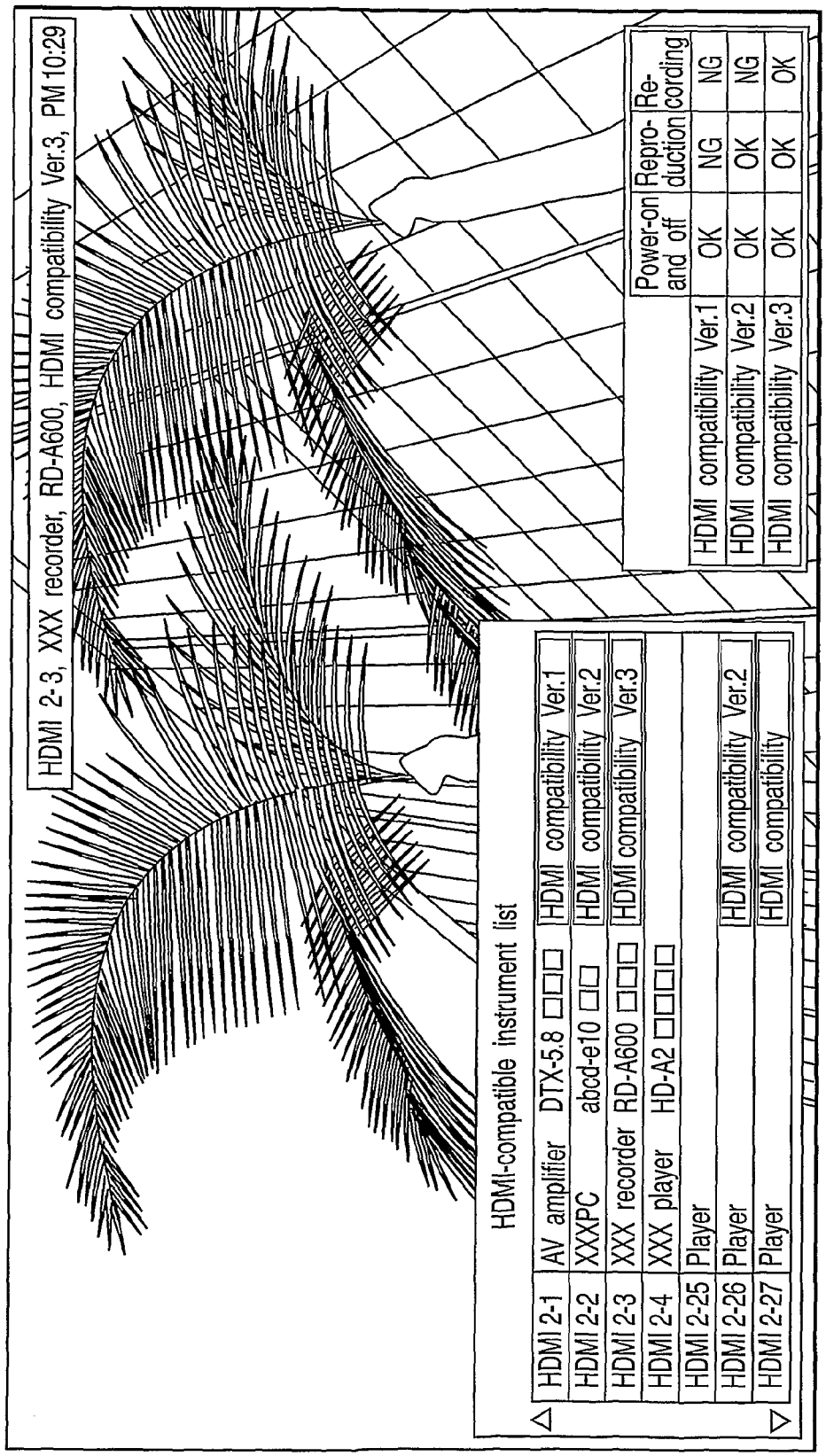
FIG. 8 is a diagram showing a display screen of a function identification list in accordance with the second embodiment.

FIG. 8 shows a display screen of the video display 14 showing that the compatibility function version information on the information communication terminal 11 is the HDMI compatibility Ver. 3 and including a function identification list showing the correspondence between the version numbers of the compatibility function version information and the instruments that can operate in conjunction with the information communication terminal 11.

The compatibility function version information on the information communication terminal 11 is the HDMI compatibility Ver. 3. Thus, the compatible operation defined in the HDMI compatibility Ver. 3 is enabled between the information communication terminal 11 and the DVD recorder 33. Therefore, the video display 14 shows the video information output by the DVD recorder 33 and also shows "HDMI compatibility Ver. 3" at any position (at the upper right end of the display screen as shown in FIG. 8) as HDMI information on the DVD recorder 33. Also in the HDMI-compatible instrument list, the video display 14 displays the "HDMI compatibility Ver. 3" as HDMI information on the DVD recorder 33.

Upon sensing a predetermined operation performed via the remote controller 17, the video display 14 reads function identification list information from the nonvolatile memory 68 and displays the information in a predetermined area of the display screen. The function identification list information indicates the correspondence between the HDMI compatibility Vers. 1, 2, and 3 and the compatible operations including power-on and -off, reproduction, and recording; the information indicates which of the compatible operations the HDMI compatibility Vers. 1, 2, and 3 enable. That is, the user can easily determine the functions enabled for the external instrument, on the basis of the HDMI compatibility version number displayed on the video display 14.

The video display device comprises a connection unit configured to connect to a plurality of external instruments via a network; a receiving unit configured to receive, from the plurality of external instrument connected to the video display device via the connection unit, standard compatibility information indicating that the external instrument meets the mutual controllability standards; a display unit configured to display video information output by one of the plurality of external instruments; a selection unit configured to select one of the plurality of external instruments, corresponded to information based on the standard compatibility information, connected to the connection unit as an output source of video information to be displayed on the display unit.

The video display device comprises a connection unit configured to connect to a plurality of external instruments via a network; a receiving unit configured to receive instrument type information specifying types of the plurality of external instruments from the plurality of external instruments connected to the video display device via the connection unit and receive standard compatibility information from those of the plurality of external instruments which meet mutual controllability standards; and a display unit configured to display list information which indicates correspondence between the instrument type information and the standards compatible information.

The video display device comprises a connection unit configured to connect to an external instrument via a network; a receiving unit configured to receive, from the external instrument connected to the video display device via the connection unit, standard compatibility information indicating that the external instrument meets the mutual controllability standards; and a recording unit configured to record the standard compatibility information received by the receiving unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A video display control device comprising:
a connection unit configured to connect to a plurality of external instruments via a network;
a receiver configured to receive, from at least one of the external instruments, instrument type information for the external instrument and mutual controllability information indicating that the external instrument is a mutually controllable instrument, if the external instrument is a mutually controllable instrument; and
a display controller configured to control display list information including the instrument type information, information indicating that the external instrument is the mutually controllable instrument based on the mutual controllability information, and information indicating whether the external instrument can be operated in conjunction with the device by operating the device using a remote controller of the device, which are associated with each other for the external instrument whose type is determined based on the instrument type information, and video information output by one of the plurality of external instruments selected on the list information.

2. The device of claim 1, wherein the display controller controls to display the information based on the mutual controllability information at any position on a display.

3. The device of claim 1, wherein the display controller controls to display the video information and information based on the mutual controllability information of the selected external instrument.

4. The device of claim 3, wherein the display controller controls to display the list information and the video information at a first display area and the information based on the mutual controllability information of the selected external instrument at a second display area.

5. The device of claim 1 further comprising a memory configured to store the list information.

6. A video display control device comprising:
a connection unit configured to connect to a plurality of external instruments via a network;
a receiver configured to receive, from at least one of the plurality of external instruments, mutual controllability information indicating that the external instrument is a mutually controllable instrument, if the external instrument is the mutually controllable instrument; and
a display controller configured to control display information indicating whether the external instrument can be operated in conjunction with the device by operating the device using a remote controller of the device according to a compatibility level which is one of version numbers corresponding to a plurality of stages from the mutual controllability information for the external instrument whose type is determined based on the instrument type information.

7. The video display device of claim 6, wherein if the compatibility level of the external instrument is higher than a compatibility level of the device, the display controller controls display information corresponding to the compatibility level of the device, to the external instrument.

8. The device of claim 6, wherein the display controller controls to display a function list indicating compatibility for each of the version numbers.

* * * * *